2,902,347
MANUFACTURE OF HYDROGEN PEROXIDE

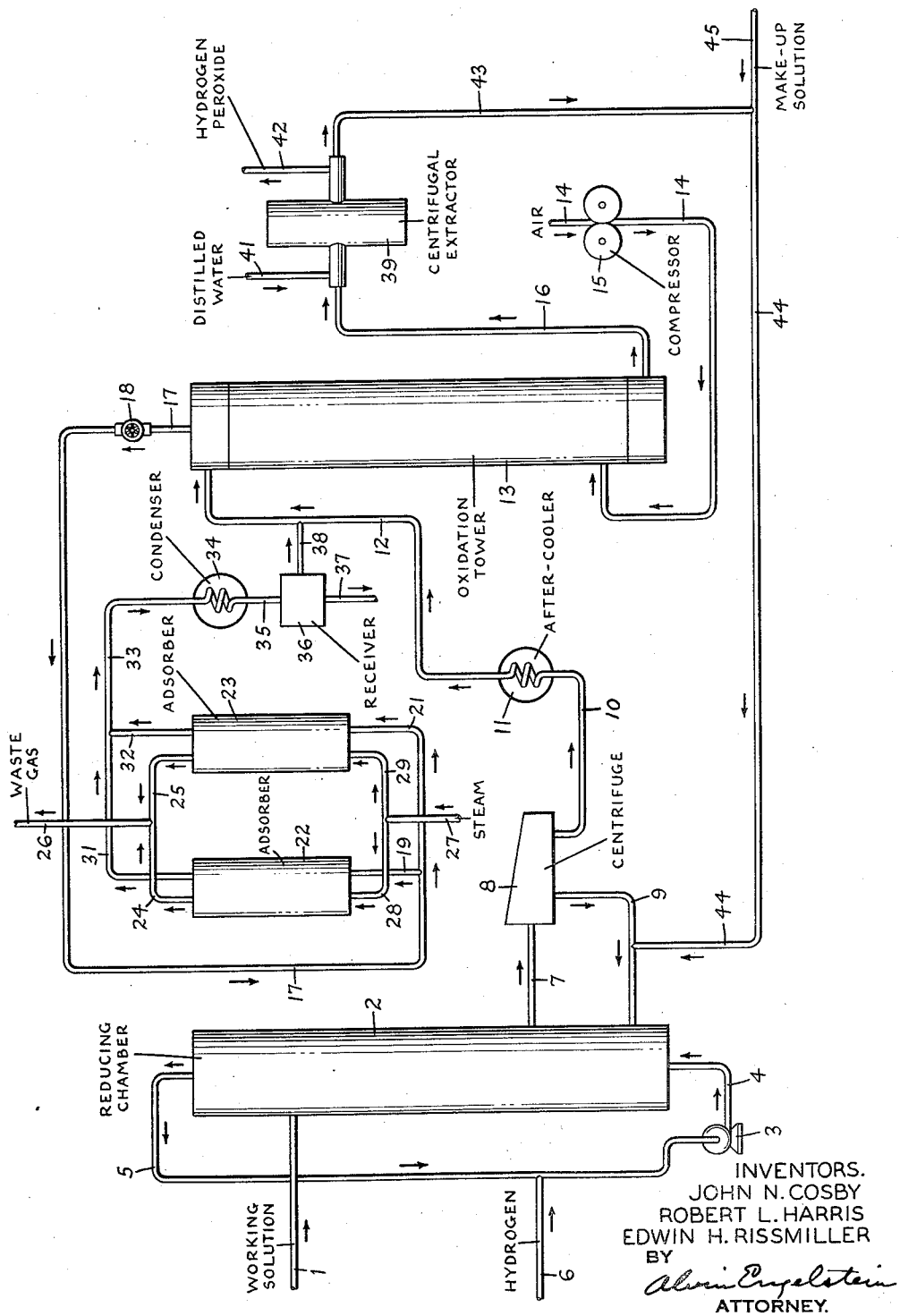

John N. Cosby, Robert L. Harris, and Edwin H. Rissmiller, Morristown, N.J., assignors to Allied Chemical Corporation, a corporation of New York Application June 14, 1954, Serial No. 436,491

1 Claim. (Cl. 23—207)

This invention relates to the production of hydrogen peroxide by reduction of a quinone compound and oxidation of the resultant hydroquinone compound and more particularly is directed to a new and improved method of effecting oxidation of the hydroquinone compound.

The anthraquinone process for the production of hydrogen peroxide involves a cyclic operation of two primary steps—(a) hydrogenating a quinone compound and (b) oxidizing the resultant hydroquinone compound thus formed back to the initial quinone compound. The quinone compounds as, for example, anthraquinone and derivatives of anthraquinone such as methyl-, ethyl-, propyl-, butyl-, chloro-, and bromo-anthraquinones, are solids at the temperature of the process and are generally dissolved in a mixed solvent, e.g. a mixture of an aromatic compound and an alcohol, which solution is termed "working solution." The present invention is particularly concerned with the oxidation step of the working solution, i.e. a mixture of hydroquinone in the solvents.

In the process operated in Germany during the war (described in P.B. Reports 395, 1737 and 4336) oxidation of the working solution was carried out by maintaining a body of working solution at atmospheric pressure in a vessel and bubbling a mixture of oxygen and nitrogen up through the body of working solution to effect partial absorption of the oxygen in the gas, removing partially spent gas from the oxidizing chamber, adding oxygen to the partially spent gas to restore its composition and recycling the thus restored oxygen containing gas to the working solution in the oxidizing chamber. This method of oxidation has several obvious disadvantages among which are the requirement for the use of oxygen gas and continuous recycling of a large body of gas both of which materially increase the cost of operation, particularly the cost of oxygen gas. The suggestion was made to use air instead of expensive oxygen gas but the substitution was found to be economically impractical because the rate of reaction was appreciably lower and also the loss in solvent carried by the exit gases leaving the oxidizer was too high.

An object of the present invention is to provide a more efficient method of effecting oxidation of a working solution in a cyclic process for the production of hydrogen peroxide involving reduction and oxidation of a quinone compound.

Another object of the present invention is to provide a process for the oxidation of a working solution at a high reaction rate with low loss of solvent and with the use of inexpensive air as the oxidant.

A further object of the present invention is to provide a method of effecting oxidation of a working solution with minimum formation of by-products due to side reactions.

Other objects and advantages of the invention will be apparent from the following description and accompanying drawing.

In addition to the other disadvantages involved in the oxidation of the working solution by the prior art processes, namely the use of expensive oxygen and large solvent loss due to evaporation, we found that side reactions occur during the oxidation causing degeneration of the working solution into other by-products resulting not only in a loss of useful working solution but also in contamination of the desired hydrogen peroxide products due to the carry-over of these by-products which are generally more soluble in water into final hydrogen peroxide product. Superficially the side reaction during the oxidation into by-products would appear insignificant since during each cycle of operation involving only one oxidation the by-product formation is roughly 0.3-0.5% by weight based on the working solution. However, it must be remembered that the yield of hydrogen peroxide in each cycle, i.e. each pass, is only 1-2% based on the working solution, or stated another way, 100-200 parts of working solution are treated per part of hydrogen peroxide produced. Thus for practical operation it is necessary to recycle the working solution a minimum of 300 times and generally more than 1000 times. Consequently when the loss of 0.3% working solution due to by-product formation is multiplied by 300 cycles, this loss represents 90% of working solution which of course must be replaced. Stated in other terms, assuming one gram of hydrogen peroxide produced per cycle for each 100 grams of working solution treated, there is a loss of 30 to 50 grams working solution per 100 grams of hydrogen peroxide produced.

From the foregoing it will be evident that any reduction in side reaction with consequent decrease in formation of by-products during the oxidation of the working solution will reflect a material economic advantage in the practical operation of the quinone process for the manufacture of hydrogen peroxide.

In the course of our investigation of the oxidation reaction of the working solution with air, oxygen or oxygen-enriched air, we found by-product formation of the working solution was caused to a considerable extent by secondary oxidation which may be explained as follows. When oxygen or an oxygen-containing gas is bubbled through a liquid body of working solution in an oxidizer vessel the anthrahydroquinone compound is converted to the hydroquinone compound as exemplified by the following equation:

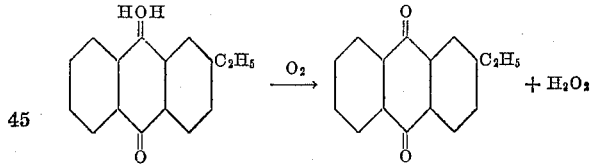

However, the oxidation reaction is not instantaneous but proceeds gradually requiring about twenty minutes to one-half hour to effect oxidation of over 70% of the anthraquinone. The quinone compounds formed at the start of the oxidation reaction remain in the working solution for the entire prolonged oxidation period and are exposed to the action of elemental oxygen during the entire period causing secondary oxidation. Further, due to the necessity for obtaining high yields of oxygenated quinone, in excess of 70%, the solvent forming the major portion of the working solution is also exposed to the action of oxygen for a long period of time with consequent formation of by-products. In this regard it should be noted that although the solvents are relatively stable organic materials, considered substantially inert to the action of oxygen, nevertheless these organic materials do degrade under exposed oxidation conditions to a small extent which, as previously pointed out, when multiplied by the large number of cycles, accumulate to an appreciable percentage. It should also be noted that the use of air when operated in a conventional manner under atmospheric pressure as compared to the more expensive oxygen enriched gas results in a much larger by-product loss because the rate of oxidation with air is very slow.

We have discovered that the deficiencies of the prior art processes for oxidation of the working solution may be minimized or overcome and inexpensive air may be employed as the oxidant with a high rate of oxidation reaction and with a minimum of by-product formation and reduced solvent loss. First, with respect to formation of by-product due to oxidation, we have found that secondary oxidation of the working solution may be eliminated or minimized by preventing retention of oxidized working solution in the oxidation zone by rapidly withdrawing the working solution containing the quinone form before any substantial secondary oxidation commences. To accomplish this objective a stream of working solution containing the hydroquinone compound is continuously passed in intimate contact with air and retained in contact with the air only for a period of time not exceeding about six minutes, preferably less than two and a half minutes, and the stream of working solution then withdrawn from the zone of exposure to the air. In practice this may be accomplished by introducing reduced working solution into the top of a vertical tower, filled if desired with packing such as glass beads to insure initimate contact, continuously introducing air near the bottom of the tower, upwardly countercurrent and in intimate contact with the down-flowing stream of working solution in the tower, continuously discharging the stream of oxidized working solution out of contact with the air, and limiting the residence time of the stream of working solution in contact with the air to less than six minutes, preferably less than two and a half minutes. In this manner the working solution is not exposed to elemental oxygen for more than a period of six minutes as compared to the conventional method of oxidation wherein oxidized working solution may be exposed to elemental oxygen for as long as 30 minutes or more. However, as previously pointed out the rate of oxidation of the working solution with air at atmospheric pressure is unduly low and due to the prolongation of the period of oxidation induces formation of by-products. The rate of oxidation of the working solution may be rapidly accelerated by increasing the partial pressure of elemental oxygen which may be accomplished by maintaining the oxidizing tower through which the working solution flows downwardly under superatmospheric pressure sufficiently high to increase the partial pressure of the oxygen in the air in the tower to at least 8 lbs. per square inch, preferably within the range of 10 to 13 lbs. per square inch. Operating the oxidizing tower with air under superatmospheric pressure with a high partial pressure of elemental oxygen therein has the additional advantage of reducing the solvent losses in that the volume of spent gases leaving the oxidizing tower is less than one-half of the volume of gases when employing air under atmospheric pressure and consequently the amount of working solution carried in vapor form by the gases is reduced to less than half, thereby appreciably cutting down losses due to evaporation of the working solution.

Thus by carrying out the oxidation reaction of the working solution with short reaction time of less than six minutes exposure of the working solution to air, continuous and rapid withdrawal of the working solution upon formation of the quinone compound, and with a high partial pressure of elemental oxygen in contact with the working solution, we may employ inexpensive air as the oxidant and obtain a high reaction rate of oxidation with materially reduced losses both with respect to by-product formation and evaporation. Indeed the working solution losses are reduced to less than one-half as compared to the conventional use of air.

The accompanying drawing diagrammatically illustrates one method of carrying out the invention.

A working solution is first prepared consisting of an alkylated anthraquinone as for example 2-ethylanthraquinone dissolved in a solvent medium, a mixed solvent with three constituents consisting of a constituent capable of dissolving the quinone such as an aromatic hydrocarbon, e.g. xylene, a constituent capable of dissolving the hydroquinone form such as an alcohol, e.g. octanol-2, and a synergistic solvent such as a ketone, e.g. acetophenone. The mixture is composed of about 10-20% quinone compound, 10-60% ketone compound, with the balance made up of the aromatic hydrocarbon and alcohol solvents. An illustrative example illustrating the composition of a typical working solution would be 15% 2-ethylanthraquinone, 20% xylene, 40% acetophenone and 25% octanol-2. The working solution, ethylanthraquinone-solvent mixture, is introduced through line 1 in a reducing chamber 2 maintained in the temperature range of about 20–50° C. under substantially atmospheric pressure of about 1–5 p.s.i.g. To the working solution is added through line 1 hydrogenation catalyst such as nickel, palladium, and platinum, preferably disposed on a solid support. The preferred catalyst consists of 5% palladium on a charcoal carrier. The amount of catalyst required is approximately 3–10% by weight of the quinone present. Hydrogen is forced by pump 3 through line 4 into the bottom of reducing chamber 2 in intimate contact with the body of working solution containing suspended catalyst. Sufficient agitation to produce the necessary interfacial area for reasonable reaction rate and to maintain necessary suspension of catalyst is supplied by sufficient circulation of the hydrogen gas stream which is released from the top of chamber 2 through line 5 to the suction side of compressor 3 and thence through line 4 to the bottom of reducing chamber 2. The hydrogen necessary to sustain the reaction is added to the circulating stream of hydrogen gas via line 6. The reduction of the anthraquinone to the hydroanthraquinone is illustrated by the following equation:

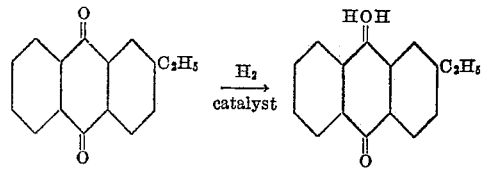

The hydrogenated solution containing suspended catalyst is discharged from reducer 2 through line 7 into centrifuge 8 wherein the catalyst is separated from the solution and returned via line 9 to reducing chamber 2. The working solution, after removal of catalyst in centrifuge 8, flows through line 10 into after-cooler 11 wherein some of the exothermic heat of reaction resulting from the hydrogenation is removed by indirect heat exchange with cooling water and the cooled working solution introduced through line 12 into the top of oxidation tower 13 which desirably is a vertical column filled with packing such as Berl saddles or glass beads. The primary reaction in oxidation tower 13 is the oxidation of the alkylated anthrahydroquinone in the working solution to the anthraquinone form with hydrogen peroxide splitting off during the reaction. The oxidation of the anthrahydroquinone is accomplished at room temperature or higher, preferably about 30–35° C. A catalyst is not required in the oxidation reaction which is carried out to effect substantially complete conversion of the hydroquinone to quinone and hydrogen peroxide. Air entering through line 14 is compressed to about 45–60 lbs. per square inch absolute by compresser 15 and forced into the bottom of oxidation tower 13 through a suitable dispersion plate in the tower, not shown in the drawing. It is important to maintain tower 13 under sufficient superatmospheric pressure to provide a partial pressure of elemental oxygen in the air entering therein in excess of 8 lbs. per square inch, preferably within the range of 10–13 lbs. per square inch. Likewise it is important to regulate rate flow of the stream of working solution entering the top of tower 13 through line 12 to maintain the residence time below 6 minutes, preferably less than 2½ minutes. As will be noted from the drawing, oxidized solution is continuously and rapidly discharged from the bottom of the tower through line 16 thereby preventing secondary oxidation of working solution containing the quinone compound. Under the conditions of operation as just outlined we have found that the hydroquinone in the working solution discharging through line 16 from the bottom of tower 13 is substantially completely oxidized to the quinone form, i.e. oxidized to the extent of over 90%, generally within the range of 95–100%.

The off-gases released from the top of oxidation tower 13 through line 17, consist principally of nitrogen, a few percent oxygen and small quantities of solvent vapors. Pressure on the tower 13 may be regulated by means of pressure regulating valve 18 in line 17. Due to the higher partial pressure of elemental oxygen in tower 13 and rapid oxidation reaction most of the elemental oxygen in the air is absorbed by the working solution in tower 13 reducing the oxygen concentration in the off-gases to generally less than 5%, usually 2 or 3%, thereby appreciably reducing the volume of gases released from the top of the tower and in turn reducing the quantity of solvent vapors carried by the off-gases. In addition, superatmospheric pressure in tower 13 reduces the volume of gas and consequently the carrying effect of the gas for solvent vapors, thereby further minimizing solvent losses, or at least the cost of recovering such solvent vapors from the gas. To further minimize loss of solvent, the off-gases flowing through line 17 may be alternately introduced through line 19 and 21 into adsorber 22 or 23 containing a suitable adsorbent material such as activated charcoal. Spent gases substantially free from solvent released from the top of adsorber 22 through line 24 and from the top of adsorber 23 through line 25 are discharged to the atmosphere through line 26. The recovery of solvents from adsorbers 22 and 23 may be effected by the introduction of superheated steam through line 27, alternately through line 28 into adsorber 22 or line 29 into adsorber 23, and vapors of solvent and steam released from the top of adsorber 22 through line 31 or the top of adsorber 23 through line 32 pass through line 33 to condenser 34 with the condensate of solvent and water flowing down through line 35 into receiver 36 wherein the condensate separates into a lower water layer and an upper solvent layer. The lower water layer is discharged from receiver 36 through line 37. The solvent layer withdrawn from receiver 36 through line 38 may be returned to oxidation tower 13 via line 12.

The products of the oxidation reaction withdrawn from the bottom of oxidation tower 13 through line 16 contains about 1% hydrogen peroxide and a small amount of byproducts, usually less than 0.2% based on the working solution of by-products. When carrying out the oxidation in a conventional manner the by-product formation usually runs 0.3–0.5% or higher based on the working solution. Reaction products from line 16 are fed to centrifugal extractor 39 into which distilled water enters through line 41 in contact with working solution resulting in a water solution containing about 10–20% dissolved hydrogen peroxide together with small amounts of impurities which are withdrawn from extractor 39 through line 42 and may, if a purer and more concentrated solution is required, be subjected to further purification and fractionation. The working solution removed from extractor 39 through line 43 is recycled to reducer 2 via line 44. Make-up solution may be added from time to time through line 45 to replace that lost from mechanical losses and chemical degradation.

The following example illustrates the present invention. A working solution is prepared consisting of 14 parts ethylanthraquinone, 15 parts xylene, 45 parts capryl alcohol and 40 parts acetophenone. A 5% palladium on carbon catalyst is added to the working solution in an amount of 4% based on the weight of the ethylanthraquinone in the working solution. The mixture of working solution and catalyst is maintained under agitation at 30° C. and 4 p.s.i.g. with the introduction of hydrogen until 80% of the ethylanthraquinone is converted to ethylanthrahydroquinone.

The catalyst is separated from the hydrogenated working solution by centrifuging and filtering and the filtered solution introduced into the top of a column filled with glass beads maintained at a temperature of 35° C. and a superatmospheric pressure of 45 p.s.i.g. The rate of flow of the hydrogenated working solution is regulated to maintain a residence time of 2½ minutes in the column in contact with air. Compressed air at a pressure of 46 p.s.i.g. is introduced into the bottom of the oxidizing tower passing upwardly countercurrent and in intimate contact with the down-flowing stream of working solution. Off-gases leaving the top of the oxidizing tower consist principally of nitrogen, about 3% oxygen and a small amount of solvent vapors. The off-gases are passed through an adsorber containing activated carbon which removes the solvent vapors and the lean waste gases are then discharged to the atmosphere. The solvent vapors trapped in the adsorber are recovered by the introduction of superheated steam and the recovered solvent returned to the oxidizing tower. The oxidized working solution containing about 1% hydrogen peroxide is continuously removed from the bottom of the oxidizing tower and scrubbed with water to remove the hydrogen peroxide product. The working solution is then returned to the reducer to start another cycle by reduction with hydrogen.

The above cyclic operation is repeated for 300 cycles during which time samples of the product are withdrawn and analyzed and the wash water employed for scrubbing the hydrogen peroxide from the working solution also analyzed. From these analyses, it will be noted that in each cycle less than 0.1% of the working solution is lost. The amount of working solution lost due to the formation of by-products in this 300 cycle operation based on the amount of hydrogen peroxide produced is less than 9 parts by weight of solvent lost per 100 parts by weight of hydrogen peroxide produced.

Although certain preferred embodiments of the invention have been disclosed for purpose of illustration it will be evident that various changes and modifications may be made therein without departing from the scope and spirit of the invention.

We claim:

In a cyclic process for the manufacture of hydrogen peroxide by reduction and oxidation of ethylanthraquinone dissolved in a mixed solvent comprising a mixture of xylene, octanol-2 and acetophenone to form a working solution, the improvement which comprises effecting said oxidation of reduced working solution by continuously passing a stream of reduced working solution downwardly through an oxidizing zone countercurrent to and in intimate contact with a continuous stream of upwardly flowing air under a partial pressure of elemental oxygen in the air entering said oxidizing zone in the range of about 10–13 lbs. per square inch, subjecting the working solution in said oxidizing zone to contact with the air for a period of time of less than about 2½ minutes and continuously discharging the oxidized working solution from the oxidizing zone to prevent secondary oxidation of the working solution.

References Cited in the file of this patent

UNITED STATES PATENTS

| Number | Name | Date |
|---|---|---|
| 2,158,525 | Riedl et al. | May 16, 1939 |
| 2,433,396 | Proell | Dec. 30, 1947 |
| 2,734,798 | Kamlet | Feb. 14, 1956 |
| 2,739,042 | Corey et al. | Mar. 20, 1956 |
| 2,804,376 | Haller et al. | Aug. 27, 1957 |

OTHER REFERENCES

Shanley: "Journal of Chemical Education," vol. 28, No. 5, page 260 (May 1951).